US008003573B2

(12) United States Patent
Ballard et al.

(10) Patent No.: US 8,003,573 B2
(45) Date of Patent: Aug. 23, 2011

(54) METHOD FOR REMEDIATING FLOW-RESTRICTING HYDRATE DEPOSITS IN PRODUCTION SYSTEMS

(75) Inventors: Adam L. Ballard, Katy, TX (US); Norman D. McMullen, Cypress, TX (US); George J. Shoup, Houston, TX (US)

(73) Assignee: BP Corporation North America Inc., Houston, TX (US)

(*) Notice: Subject to any disclaimer, the term of this patent is extended or adjusted under 35 U.S.C. 154(b) by 404 days.

(21) Appl. No.: 12/082,742

(22) Filed: Apr. 14, 2008

(65) Prior Publication Data

US 2009/0111715 A1 Apr. 30, 2009

Related U.S. Application Data

(60) Provisional application No. 61/000,542, filed on Oct. 26, 2007.

(51) Int. Cl.

| | |
|---|---|
| ***C04B 33/04*** | (2006.01) |
| ***C09K 8/52*** | (2006.01) |
| ***E21B 43/28*** | (2006.01) |
| ***E21B 43/00*** | (2006.01) |
| ***E21B 7/12*** | (2006.01) |

(52) U.S. Cl. .......... 507/90; 507/202; 166/335; 166/369; 166/371

(58) Field of Classification Search .................... 507/90, 507/202; 166/335, 371, 369

See application file for complete search history.

(56) References Cited

U.S. PATENT DOCUMENTS

| | | | | |
|---|---|---|---|---|
| 6,035,933 | A * | 3/2000 | Khalil et al. | 166/263 |
| 6,756,345 | B2 * | 6/2004 | Pakulski et al. | 507/246 |
| 2008/0053659 | A1 | 3/2008 | Kinnari et al. | |

FOREIGN PATENT DOCUMENTS

| | | |
|---|---|---|
| WO | 00/17484 | 3/2000 |
| WO | 2006/027609 A1 | 3/2006 |

OTHER PUBLICATIONS

PCT International Search Report and Written Opinion dated Feb. 5, 2009 for International Application No. PCT/US2008/080868.

Simon R. Davies, Joe W. Nicholas, Collin Timm, Caroly A. Koh and E.Dendy Sloan, "Hydrate Dissociation by Nitrogen Purging: Overview of Proof-of-Concept Experiment and proposed Refinements", study conducted by contract by Applicants.

Haneda H., Sakamoto Y., Kawamura T., Aoki K., Komai T., "Experimental Study on Dissociation Behavior of Methane Hydrate", presented at the Fifth International conference on Gas Hydrates, Jun. 12-16, 2005, Trondheim, Norway.

Ryokichi Hamaguchi, Yuki Nishimura, Yosuke Matsukuma and Masaki Minemoto, "A Fluid Dynamic Study of Recovery System of Methane Hydrate", presented at the Fifth International conference on Gas Hydrates, Jun. 12-16, 2005, Trondheim, Norway.

"The Hydrate Forum Newsletter", Jun. 8.

* cited by examiner

*Primary Examiner* — Timothy J. Kugel
*Assistant Examiner* — Atnaf Admasu
(74) *Attorney, Agent, or Firm* — Jayne C. Piana

(57) ABSTRACT

A method to remove hydrate plugs in a production system by passing a non-hydrate-forming or a hydrate-forming gas, which forms hydrates at a higher pressure than the existing hydrate, through the flow-restricting hydrate.

20 Claims, 2 Drawing Sheets

METHOD FOR REMEDIATING FLOW-RESTRICTING HYDRATE DEPOSITS IN PRODUCTION SYSTEMS

RELATED CASES

This application is entitled to and hereby claims the benefit of the filing date of U.S. Provisional Application No. 61/000,542 filed Oct. 26, 2007 by Adam L. Ballard, Norman D. McMullen and George Shoup entitled "Hydrate Remediation Using High Pressure Inert Gas".

FIELD OF THE INVENTION

The present invention relates to the removal of hydrate plugs in a pipeline, well or equipment by passing a gas, which forms hydrates with water only at a higher pressure than the existing hydrate or doesn't form a hydrate at all, through the flow-restricting hydrate.

BACKGROUND OF THE INVENTION

In nearly all aspects of oil and gas production, pipelines operate at conditions suitable for the formation of hydrates. These hydrates can be quite stable and can be difficult to remove from lines which are plugged by such hydrates. Hydrates of light hydrocarbon gases typically form at temperatures and pressures in the neighborhood of about 40° F. and pressures of about 200 psia or greater. Note that seawater temperatures of 40° F. are relatively common in many oil and gas producing regions, as well as pressures an order of magnitude greater than 200 psia in the production systems. Particularly in the Gulf of Mexico, the formation of such hydrates has been a continuing problem with in-field lines, export pipelines, production wells, water injection wells, process piping and equipment.

There are basically four ways known to remediate such hydrate plugs. First, the pressure of the hydrate plug can be changed to a lower pressure, outside the stable range for the hydrates, thereby melting the hydrate. In many instances it may be difficult to lower the pressure below the hydrate stability pressure. In any event, when the pressure is lowered below the hydrate stability pressure, the decomposition of the hydrate is relatively slow, thereby requiring downtime in the production system for a substantial period of time to remove the hydrate. As well, if a large differential pressure is seen across the hydrate plug, it is likely for the plug to become a high speed projectile with the potential of causing equipment damage and/or personnel safety concern.

Secondly, the temperature of the hydrate can be increased above the hydrate stability temperature. As with the pressure technique described above, raising the temperature of the plug creates the potential for equipment damage and/or personnel safety concern.

Thirdly, the hydrates can be removed mechanically. While commonly used to remediate hydrate plugs in production wells, this method can be difficult to employ in production equipment and/or pipelines.

Fourthly, it is possible in some instances to inject a chemical such as alcohol or glycol to dissolve the hydrate. These liquids are effective in melting hydrates but are typically required in relatively large quantities if the plug is extensive. If the plug is a significant distance from the nearest injection location, this method may not be feasible.

It has long been known that hydrates exist in subsea environments and it has been hypothesized that these hydrates can be dissociated to become a source of methane gas production. A study directed to this technology is "Experimental Study on Dissociation Behavior of Methane Hydrate by Air" by Haneda H. et al. presented at the Fifth International conference on Gas Hydrates, Jun. 12-16, 2005, Trondheim, Norway. This reference is hereby incorporated in its entirety.

This reference deals with the recovery of methane from subsea hydrate deposits. It in no way suggests that the techniques disclosed therein could be used to remove hydrate plugs from pipe or production systems.

Accordingly, considerable effort has been directed toward the development of improved methods for removing hydrate plugs from pipe and production systems.

SUMMARY OF THE INVENTION

The present invention comprises a method for remediating flow restricting hydrate deposits comprising hydrates of light hydrocarbons and their contaminants and water from a production system, including at least a length of pipe at a temperature and pressure at which light hydrocarbon gas and water hydrates can form and remain stable in the pipe and form a plug in the pipe at hydrate plugging conditions. The method comprises: selecting a gas which either (1) forms hydrates with water only at a higher pressure than the hydrate plug conditions or (2) does not form hydrates with water; passing the selected gas in contact with the hydrates containing light hydrocarbon gas and water in the pipe to remediate the flow-restricting hydrate deposits; and, recovering light hydrocarbon gas from the pipe as the flow-restricting hydrate deposits containing light hydrocarbon gas and water are remediated and release hydrocarbon gas.

DESCRIPTION OF PREFERRED EMBODIMENTS

Figure 1:
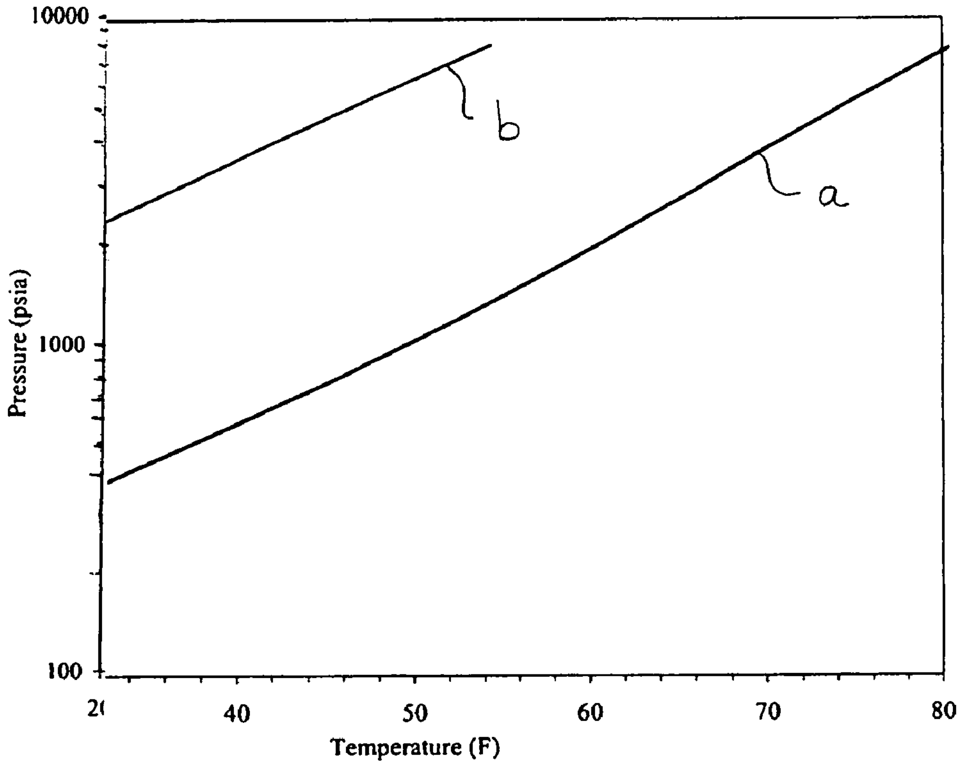
FIG. 1 is a graph illustrative of hydrate-forming conditions for nitrogen and water and for light hydrocarbon gas and water.
Figure 2:
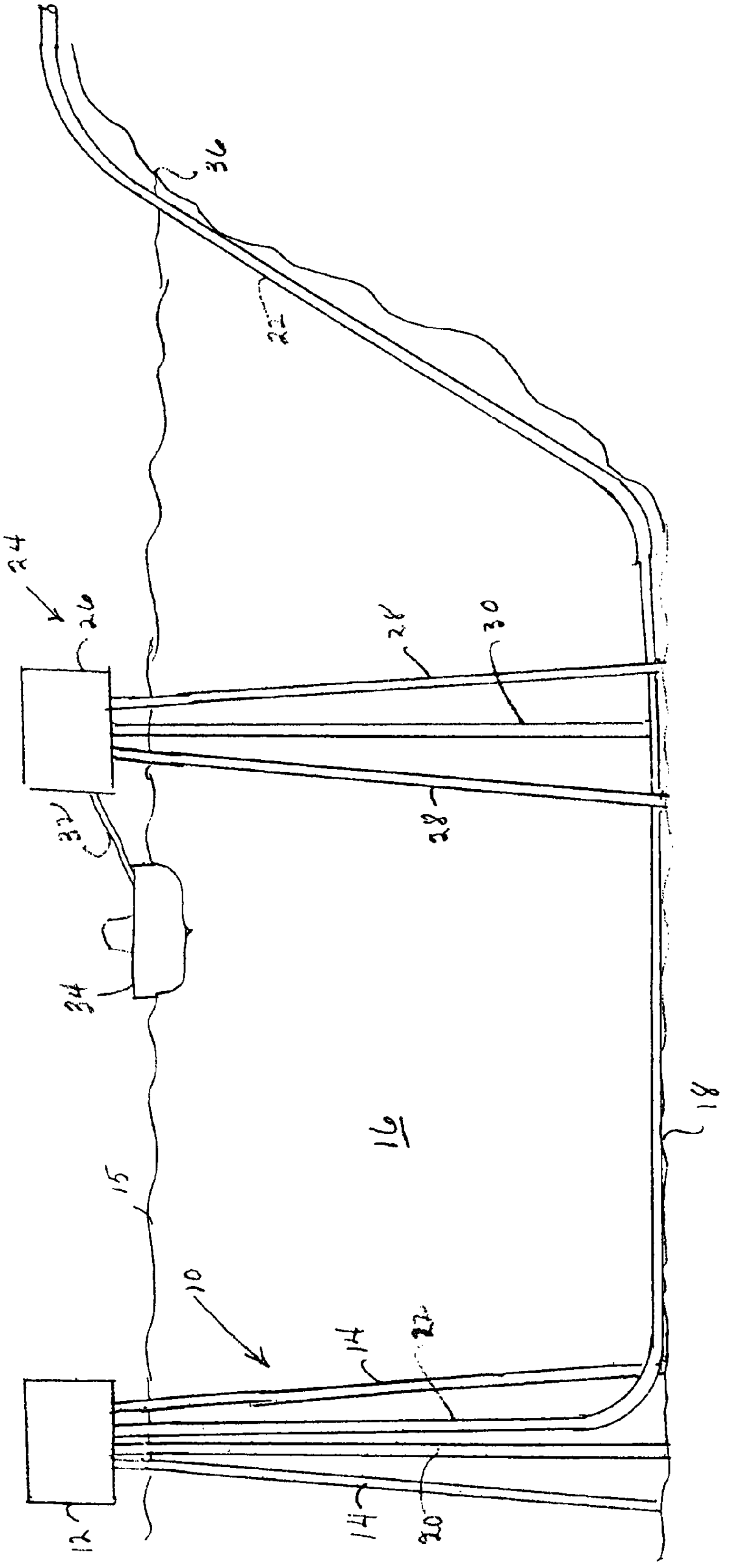
FIG. 2 is a schematic diagram of an embodiment of a pipeline in which the method of the present invention is useful.

In oil and gas production systems, especially subsea pipelines, a frequent problem is caused by the accumulation of solid hydrates, particularly light hydrocarbon gas/water hydrates, in the pipeline causing hydrate plugs. On occasion hydrocarbon system contaminants such as hydrogen sulfide and carbon dioxide also cause hydrate plugs with water in related process systems. These plugs are difficult to remove. As discussed previously, these plugs can be removed by (1) lowering the pressure of the plug, (2) increasing the temperature of the plug, (3) mechanically removing the plug, or (4) using chemicals to melt the plug.

Light hydrocarbon gas/water hydrates commonly form in pipelines in the Gulf of Mexico and other gas and oil producing regions. These hydrates can form at pressures as low as 200 psi at 40° F. and are stable up to pressures as high as 10,000 to 15,000 psi at 80° F. These hydrates may form plugs in production systems used for the transportation of natural gas wherein water is included with the natural gas. It is possible in some instances to insulate lines to avoid hydrate-forming conditions and it is possible, in some instances, to use methanol or anti-agglomerating agents to prevent the formation of hydrates and hydrate plugs. Methanol and glycol can be used to dissolve the hydrates but are both expensive and can take a long period of time to dissolve the hydrates. Such hydrate deposits and plugs can, in some instances in long pipelines, be miles long. These hydrate plugs are generally permeable to gas flow but are not permeable to liquids.

Accordingly, considerable effort has been directed to the development of methods whereby these hydrates can be removed relatively simply and economically.

According to the present invention, either (1) a hydrate-forming gas which forms hydrates with water only at a pressure higher than the pressure in the pipeline (e.g. is a less stable hydrate forming gas) or (2) a non-hydrate-forming gas, is injected into the pipe to contact the hydrate. Since this gas will not be able to form hydrates of the selected gas and water, the gas tends to melt the hydrate plug by passing into and through it. The selected gas, for instance nitrogen, can be injected at pressures up to 3,500 psi, which is the hydrate forming pressure for nitrogen/water hydrates at 40° F. Other gases, such as helium, form hydrates at pressures as high as 87,000 psi. When these gases are passed through the light hydrocarbon gas/water hydrate, the net result is the dissociation of the hydrate and the remediation of the flow restrictions as a result of the presence of the hydrate. As a result of the injection of the selected gas, light hydrocarbon gas and other light hydrocarbons are typically released as the hydrates disperse.

The light hydrocarbon gas hydrates may contain methane, ethane, propane, butane, iso-butane and the like. Other materials may also be included but these are the predominant light hydrocarbon gases which are normally found in the plugging hydrates.

The nitrogen gas is typically injected at a pressure from about 200 up to about 3,500 psi. Nitrogen gas is available on most oil production facilities and is readily used in large volumes for injection to remediate hydrate plugs. Other selected gases or gas mixtures can be used, such as air, nitrogen, helium, argon, krypton, neon, oxygen, chlorine, or hydrogen.

In FIG. 1, a graph illustrating the difference in hydrate formation conditions between a light hydrocarbon gas/water hydrate system and a nitrogen/water hydrate system is shown. Line "a" shows the temperature and pressure conditions for hydrate formation with a light hydrocarbon gas/water hydrate system. Hydrates are formed in the area above line "a". In other words, methane/water systems having a temperature and pressure below the temperature/pressure conditions shown by line "a" would be gaseous mixtures or gaseous light hydrocarbon gas and liquid water, whereas those at or above the line "a" would be solid hydrates.

Similarly with line "b", the pressure and temperature ranges defining the hydrate formation conditions for a nitrogen/water system are shown. In other words, above line "b" a nitrogen/water system will form hydrates and below line "b" water and nitrogen will exist separately.

According to the present invention, a gas is injected into a hydrate system wherein the gas has a hydrate formation pressure higher than the pressure in the hydrate system at the hydrate temperature. For instance, in FIG. 1 it will be noted, at 40° F. an oil field hydrate pressure for a light hydrocarbon gas/water hydrate is about 200 to about 300 psia. The nitrogen hydrate pressure corresponding to this temperature is greater than 3,000 psia. In other words, at about 40° F. and about 200 psia or at other temperatures and pressures shown on or above line "a" on the graph, light hydrocarbon gas/water hydrates can form. However, nitrogen/water system hydrates cannot form below line "b". Accordingly, injecting nitrogen into a light hydrocarbon gas/water hydrate system will result in penetration of the hydrate system by the nitrogen gas but since the nitrogen gas is at a condition where it cannot form hydrates, the net result is that it disintegrates the light hydrocarbon gas/water hydrate.

For offshore use, nitrogen is preferred because of its low cost and is relatively benign when mixed with hydrocarbons. The use of air mixtures has the potential to create explosive mixtures. In any event, the injection of a non-hydrate-forming or hydrate-forming gas which forms hydrates only at a higher pressure than the light hydrocarbon gas/water hydrate is effective to remove the light hydrocarbon gas/water hydrate.

Applicants have had studies conducted to demonstrate the effectiveness of the process of the present invention, with the studies being reported in a document headed "Hydrate Dissociation by Nitrogen Purging: Overview of Proof-of-Concept Experiment and Proposed Refinements" by Simon R. Davies, Joe W. Nicholas, Collin Timm Carolyn A. Koh and E. Dendy Sloan. This work was conducted and reported by these individuals under a contract between the Colorado School of Mines and British Petroleum Company (BPAI) to confirm BPAI's premise that the nitrogen would be effective to dissolve hydrates. Various tests are disclosed in this report which is illustrative of the effectiveness of the use of nitrogen. This report is hereby incorporated in its entirety by reference.

An illustrative embodiment is shown in the FIGURE wherein a body of water 16 is shown above a sea floor 18. A platform 10 is shown schematically and provides a facility 12 on legs 14 above a water level 15. A pipeline 22 is shown transporting produced hydrocarbons away from platform 10 through pipeline 22. A line 20 is shown as a producing line through which hydrocarbons are produced from a subterranean formation. Line 22, referred to herein as a transport line, transports hydrocarbons to a line 30 where they are passed upwardly through line 30 to a facility 26 supported by legs 28 from the sea floor. This facility is a loading platform and includes a loading line 32 for loading products into a ship 34. Line 22 is also shown as continuing to the shore 36 to transport products to the shore.

A wide variety of piping arrangements are available and typically the platform facilities include varied equipment necessary to produce hydrocarbons from subterranean locations. This equipment may include items such as drilling equipment, solid gas separators, control systems, pumps, and the like as well known to those skilled in the art.

Similarly platform 26 may include equipment necessary to separate or directly load hydrocarbon products onto a ship 34. Such lines can also be gathering lines between the platforms. These lines are typically referred to as in-field lines or transportation lines for the transportation of products either to loading platforms to in-field processing facilities or to the shore. Similarly at an earth surface, gathering lines may extend from wells to a central processing facility, constitute transportation pipelines, or the like. In many instances, the product from the processing facility is shipped by pipeline from the field to a larger collection system or to a market or to further processing through a pipeline.

The raw products recovered from, for instance, gas wells or combined oil and gas wells, typically will contain substantial quantities of water and the opportunities for hydrate formation are much greater with these unprocessed streams. Nevertheless the need for transportation of these streams through pipelines to central gathering stations, processing facilities or the like is a major requirement for oil field operations.

The removal of hydrate deposits according to the present invention is considered to melt the hydrate plugs in about one-eighth of the time required to remove hydrate plugs by de-pressurizing the line.

Accordingly, the reduction of the cost to maintain these pipelines in operable condition when hydrate plugs occur is a matter of grave concern and it has long been an objective of those skilled in the art to find a relatively economical and effective method for effectively and quickly opening such pipelines so they can continue to be useful. According to the present invention, this goal is readily achieved economically and expeditiously.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for remediating flow restricting hydrate deposits comprising hydrates of a light hydrocarbon gas and water from a production system, including at least a length of pipe at a temperature and pressure at which the light hydrocarbon gas and water hydrates can form and remain stable in the pipe and can form a plug in the production system at hydrate plugging conditions, the method comprising:

a) selecting a gas which either (1) forms hydrates with water at a higher pressure than the hydrate plugging conditions or (2) does not form a hydrate with water;

b) passing the selected gas in contact with the hydrates containing the light hydrocarbon gas and water to remediate the flow-restricting hydrate deposits; and, c) recovering the light hydrocarbon gas from the pipe as the flow-restricting hydrate deposits containing the light hydrocarbon gas and water are remediated and release light hydrocarbon gas.

2. The method of claim 1 wherein the light hydrocarbon gas is selected from the group consisting of methane, ethane, propane, butane, isobutane and mixtures thereof.

3. The method of claim 1 wherein the light hydrocarbon gas is methane.

4. The method of claim 1 wherein the selected gas is selected from the group consisting of nitrogen, air, helium, oxygen, chlorine, hydrogen, argon, krypton, neon or any mixture thereof.

5. The method of claim 1 wherein the selected gas is nitrogen or air.

6. The method of claim 1 wherein the selected gas is nitrogen.

7. The method of claim 1 wherein the pipe is an in-field pipeline.

8. The method of claim 1 wherein the pipe is a subsea pipeline.

9. The method of claim 1 wherein the pipe is a subsea in-field pipeline.

10. The method of claim 1 wherein the pipe is a subsea hydrocarbon transportation pipeline.

11. The method of claim 1 wherein the pipe is a production well.

12. The method of claim 1 wherein the pipe is a water injection well.

13. The method of claim 1 wherein the pipe is a part of production equipment such as a heat exchanger.

14. The method of claim 1 wherein the selected gas is passed into the hydrates containing light hydrocarbon gas and water.

15. The method of claim 1 wherein the selected gas is passed in contact with or through the flow-restricting hydrate deposits until the flow-restricting hydrates have been at least partially remediated to remove a flow restriction by remediating hydrate deposits in the pipe.

16. A method for remediating flow restricting hydrate deposits comprising hydrates of a light gas selected from the group consisting of carbon dioxide and hydrogen sulfide and mixtures thereof and water from a production system, including at least a length of pipe at a temperature and pressure at which the light gas and water hydrates can form and remain stable in the pipe and can form a plug in the production system at hydrate plugging conditions, the method comprising:

a) selecting a gas other than the light gas which either (1) forms hydrates with water at a higher pressure than the hydrate plugging conditions or (2) does not form hydrates with water;

b) passing the selected gas other than the light gas in contact with the hydrates containing the light gas and water to remediate the flow-restricting hydrate deposits; and, c) recovering the light gas from the pipe as the flow-restricting hydrate deposits containing the light gas and water are remediated.

17. The method of claim 16 wherein the selected light gas is carbon dioxide.

18. The method of claim 16 wherein the selected light gas is hydrogen sulfide.

19. The method of claim 16 wherein the selected light gas is a mixture of carbon dioxide and hydrogen sulfide.

20. A method for remediating flow restricting hydrate deposits from a subsea pipeline associated with an oil and gas production system, the hydrates comprising hydrates of one or more light hydrocarbon gases and/or one or more contaminants thereof and water, at least a length of the subsea pipeline being at a temperature and pressure at which the hydrates can form, remain stable, and form a plug in the subsea pipeline, the method comprising:

a) passing nitrogen gas in contact with at least a portion of the hydrates to remediate at least some of the flow-restricting hydrate deposits; and, b) recovering the one or more light hydrocarbon gases and/or contaminants thereof from the subsea pipeline as the hydrates are remediated and release the light hydrocarbon gases and/or contaminants thereof.

* * * * *